UNITED STATES PATENT OFFICE.

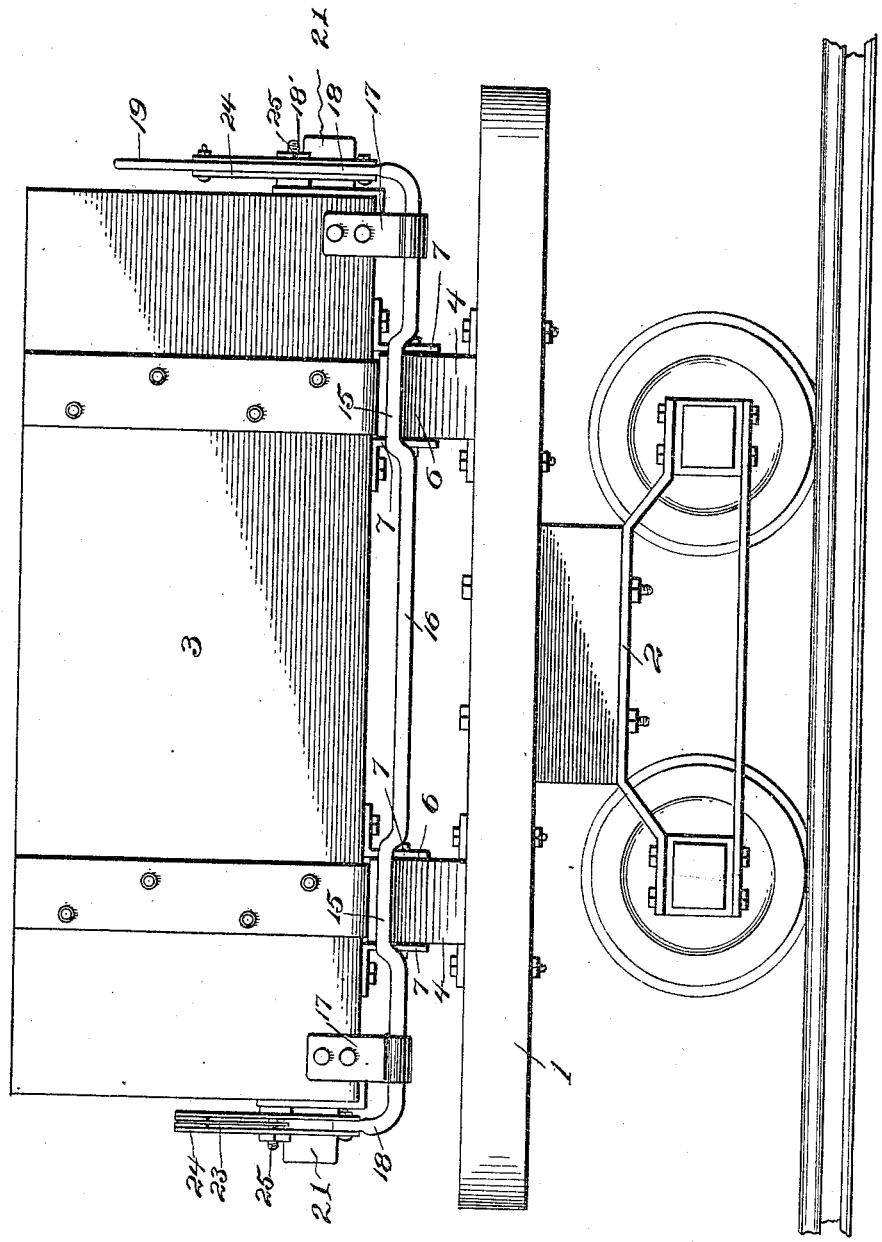

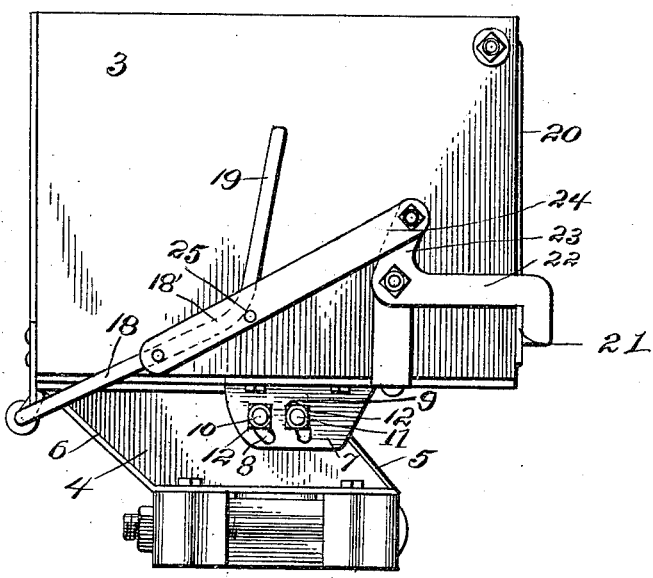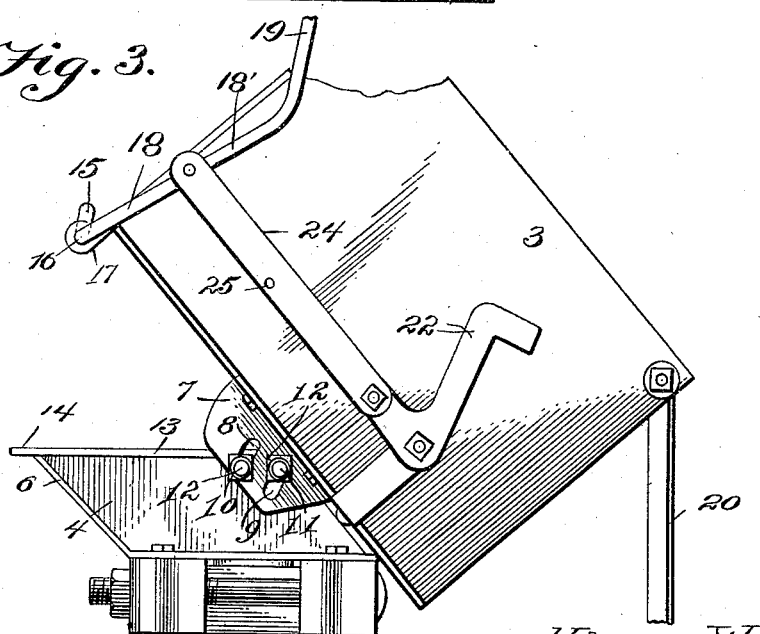

ULYSSES WINFIELD KEECH, OF ENUMCLAW, WASHINGTON.

DUMPING-CAR.

960,949.  Specification of Letters Patent.  Patented June 7, 1910.

Application filed March 30, 1909. Serial No. 486,784.

*To all whom it may concern:*

Be it known that I, ULYSSES WINFIELD KEECH, a citizen of the United States, residing at Enumclaw, in the county of King and State of Washington, have invented new and useful Improvements in Dumping-Cars, of which the following is a specification.

This invention relates to dumping cars for use in transporting coal and other materials, in mining and general excavating and construction work, the object of the invention being to provide a car which is simple, strong, durable and inexpensive in construction, light in weight and in which the body is adapted to dump automatically under the weight of the load and to be easily and conveniently returned to and effectively locked in normal position.

With these and other objects in view, the invention consists of the features of construction, combination and arrangement of parts hereinafter fully described and claimed, reference being had to the accompanying drawings, in which:

Figure 1 is a side elevation of a dumping car embodying my invention, showing the body of the car in normal position. Fig. 2 is an end elevation of the same. Fig. 3 is an end elevation showing the body of the car tilted for dumping the load.

Referring to the drawings, 1 designates the base frame of the car which may be of any preferred construction and provided with any suitable type of draft gearing, and which is mounted upon a suitable wheeled truck 2.

The car body 3, which may be of wood or metal, or of a composite structure and of any preferred general form, is adapted to rest in normal position upon a pair of transverse bolsters 4 rigidly secured to the base frame 1, the ends of which bolsters at one side of the frame are cut away or beveled inwardly and upwardly to provide a clearance space for the free movement of the body in its dumping operation, while the other ends of the bolsters at the opposite side of the car are correspondingly beveled to project laterally therefrom. These ends or portions of the bolsters are respectively designated by the reference numerals 5 and 6.

The body is provided on its under side for coaction with each bolster 4 with a pair of spaced bracket plates 7 which are rigidly secured to the bottom of the car and project downwardly on each side of the bolster adjacent the beveled end 5 of the latter. The said bracket plates are each formed with a pair of closely related segmental slots 8 and 9 projecting downward in concentric relation and through which and the bolster pass a pair of pivot bolts 10 and 11, each provided with a retaining nut 12. The body 3 is adapted to swing or have pivotal motion on these bolts to tilt outwardly at one side to the inclined position shown in Fig. 3 for the purpose of dumping the load and to return to the normal horizontal position shown in Figs. 1 and 2, the beveled surfaces 5 of the bolsters serving as bumpers to limit the outwardly tilting movement of the body and to serve as rests or supports while it is in this position. The bolts 10 and 11 are adapted by the described form and arrangement of the slots 8 and 9 to permit the body to swing freely in both directions, and engage the end walls of the slots to limit the tilting motion of the body, in which respect they supplement the supporting action of the bumpers 5 to securely support the body in tilted position.

Metallic wear and reinforcing strips 13 cover the upper, lower and end surfaces of each bolster to secure maximum strength and durability, and in the construction shown each of these strips has a portion projecting beyond the end 6 of the bolster to provide a latch member or keeper 14. These latch members or keepers are adapted to be engaged by coacting latch members 15 formed by cranks or offsets upon a rock shaft 16 journaled in bearing brackets 17 at the side of the car seating above the portions 6 of the bolsters, and this shaft is provided at each end with a crank arm 18 arranged to project at right angles therefrom beyond the adjacent end of the body, one of which crank arms is bent at an angle at its free end to form an operating lever or handle 19.

The opposite side of the car, or that side which projects beyond and above the surfaces 5 of the bolster, is open and adapted to be closed by a gravity door 20 mounted at its upper edge upon the end walls of the car in any suitable manner to swing inwardly and outwardly. This door is provided adjacent its lower edge with latch arms or extensions 21 arranged to project beyond the ends of the car when the door is in closed position. Hooked locking devices 22 are pivotally mounted upon the ends of the car to swing into and out of engagement with said arms 21 and are provided with crank arms 23 connected with the respective cranks 18 of the rock shaft 16 by links 24, each of which is preferably formed of a pair of parallel plates between which the free ends of the arms 18 are adapted to fold, said free ends of the arms forming bracing extensions 18' to engage supporting pins or studs 25 carried by the links when the parts are in door closing position to limit the downward pivotal motion of said crank arms and maintain the parts automatically locked against retractive movement.

Figs. 1 and 2 of the drawings show the body in normal position, in which it is held against the weight of the load by the engagement of the latch members 15 of the rock shaft with the latch members 14 on the bolsters, in which position of the parts the locking hooks 22 also engage the arms 21 to hold the door closed. By simply throwing the lever arm 19 in a direction away from the open side of the body and toward the closed side thereof, it will be apparent that the shaft 16 will be rocked to throw the latch members 15 out of engagement with the latch members 14, thus allowing the body to tilt downwardly to the dumping position at one side of the car shown in Fig. 3 under the weight of the portion of the load at that side, while the hooks 22 will be simultaneously retracted through the movement of the link 24 to allow the door 20 to swing open by gravity for the discharge of the load. The body when unloaded is approximately balanced on its pivotal supports, so that by an easy reverse movement from that described the body may be swung back to its normal position and locked against movement by the resulting automatic projection of the latch members 15 and locking hooks 22.

From the foregoing description, taken in connection with the drawings, the construction and mode of operation of my improved dump car will be readily understood, and it will be seen that the invention provides a car which is simple of construction, adapted to automatically tilt in an effective manner to dump the load, and which is adapted to be easily returned to normal position and locked firmly and securely against dumping motion. The car may be employed for transporting coal or other materials in general railway traffic, in transporting coal in mining and in transporting other materials in general excavating and construction work, and may be strongly built at a comparatively low cost.

Having thus fully described the invention what is claimed as new is:

A dumping car comprising a base frame provided at one side with latch members, a body pivotally mounted on the frame and having a gravity opening door provided with latch members projecting beyond the ends thereof, a rock shaft on the side of the body provided with latch members to engage the latch members on the frame and having crank arms at its ends arranged at the ends of the body, one of said arms being extended to form an operating lever, locking hooks on the ends of the body to engage the latch members on the door and provided with crank arms, links composed of spaced plates connecting the crank arms of the locking hooks with the crank arms of the rock shaft and between the plates of which the latter are adapted to fold, and stops carried by said link plates to limit the swinging movement of said crank arms.

In testimony whereof I affix my signature in presence of two witnesses.

ULYSSES WINFIELD KEECH.

Witnesses:
E. SCHOMBURG,
J. B. POTTS.